(12) United States Patent
Lee

(10) Patent No.: US 10,760,472 B2
(45) Date of Patent: Sep. 1, 2020

(54) ELECTRONIC THERMOSTAT, COOLING SYSTEM PROVIDED WITH THE SAME AND CONTROL METHOD FOR THE SAME

(71) Applicants: Hyundai Motor Company, Seoul (KR); Kia Motors Corporation, Seoul (KR)

(72) Inventor: Hyo Jo Lee, Suwon-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 35 days.

(21) Appl. No.: 16/193,020

(22) Filed: Nov. 16, 2018

(65) Prior Publication Data

US 2019/0323414 A1 Oct. 24, 2019

(30) Foreign Application Priority Data

Apr. 23, 2018 (KR) .......................... 10-2018-0046659

(51) Int. Cl.
*F01P 7/16* (2006.01)
*F01P 3/02* (2006.01)
*G05D 23/185* (2006.01)

(52) U.S. Cl.
CPC .................. *F01P 7/165* (2013.01); *F01P 3/02* (2013.01); *G05D 23/1852* (2013.01); *F01P 2003/027* (2013.01); *F01P 2025/66* (2013.01); *F01P 2031/16* (2013.01)

(58) Field of Classification Search
CPC ........ F01P 7/165; F01P 3/02; F01P 2003/027; F01P 2025/66; F01P 2031/16; F01P 7/16; G05D 23/1852
See application file for complete search history.

(56) References Cited

U.S. PATENT DOCUMENTS

| | | | |
|---|---|---|---|
| 2015/0144078 A1* | 5/2015 | Hutchins ................ | F01P 7/165 123/41.1 |
| 2015/0176472 A1* | 6/2015 | Hutchins ................ | F01P 7/16 701/102 |
| 2016/0109890 A1* | 4/2016 | Styron ................ | G05D 23/022 236/34.5 |

* cited by examiner

*Primary Examiner* — Syed O Hasan
(74) *Attorney, Agent, or Firm* — Morgan, Lewis & Bockius LLP

(57) ABSTRACT

An electronic thermostat may include an internal housing including a partition defining a head chamber communicating with a cylinder head and a block chamber communicating with an engine block and the internal housing of which a head chamber hole and a block chamber hole are formed thereto, an external housing of which an outlet is formed thereto and the external housing covering the internal housing, a thermostat heater disposed to the partition, a first opening/closing portion including a first wax receiving heat from the thermostat heater and selectively closing or opening the head chamber hole and a second opening/closing portion including a second wax receiving heat from the thermostat heater and selectively closing or opening the block chamber hole.

19 Claims, 9 Drawing Sheets

ELECTRONIC THERMOSTAT, COOLING SYSTEM PROVIDED WITH THE SAME AND CONTROL METHOD FOR THE SAME

CROSS-REFERENCE TO RELATED APPLICATION

The present application claims priority to Korean Patent Application No. 10-2018-0046659 filed in the Korean Intellectual Property Office on Apr. 23, 2018, the entire contents of which is incorporated herein for all purposes by this reference.

BACKGROUND OF THE INVENTION

Field of the Invention

The present invention relates to an electronic thermostat, a cooling system provided with the same and a control method for the same. More particularly, the present invention relates to an electronic thermostat, a cooling system provided with the same and a control method for the same capable of enhance fuel economy by controlling supplying coolant to a cylinder head and an engine block independently.

Description of the Related Art

An engine exhausts thermal energy while generating torque by combustion of fuel, and the coolant absorbs the thermal energy while circulating through the engine, a heater, a radiator, and the like and discharges the absorbed thermal energy to the outside.

When a coolant temperature of the engine is low, oil viscosity is increased and thus a frictional force is increased, fuel economy is increased, time for activating a catalyst is increased since a temperature of an exhaust gas is slowly increased, and quality of the exhaust gas deteriorates. Furthermore, time for normalization of heater functions is increased, causing discomfort to a user.

When the coolant temperature of the engine is excessively increased, knocking is caused and thus ignition timing is adjusted to suppress the generation of knocking, and accordingly performance of the engine may be deteriorated and when lubricant is excessively heated, lubrication performance may be deteriorated.

Accordingly, if coolant in a specific portion of the engine is maintained in high temperature and coolant in other portions of the engine is maintained in low temperature, fuel economy may be enhanced. For example, independent controlling of coolant temperatures of a cylinder head and an engine block may enhance fuel economy.

However, for independent controlling of coolant temperatures of a cylinder head and an engine block, more than two thermostats are required.

The information included in this Background of the Invention section is only for enhancement of understanding of the general background of the invention and may not be taken as an acknowledgement or any form of suggestion that this information forms the prior art already known to a person skilled in the art.

SUMMARY OF THE INVENTION

Various aspects of the present invention are directed to providing an electronic thermostat, a cooling system provided with the same configured for enhance fuel economy by controlling supplying coolant to a cylinder head and an engine block independently.

According to an exemplary embodiment of the present invention of the present invention, coolant flows to a cylinder head and an engine block independent with one thermostat heater.

An electronic thermostat an exemplary embodiment of the present invention may include an internal housing including a partition defining a head chamber communicating with a cylinder head and a block chamber communicating with an engine block and the internal housing of which a head chamber hole and a block chamber hole are formed thereto, an external housing of which an outlet is formed thereto and the external housing covering the internal housing, a thermostat heater disposed to the partition, a first opening/closing portion including a first wax receiving heat from the thermostat heater and selectively closing or opening the head chamber hole and a second opening/closing portion including a second wax receiving heat from the thermostat heater and selectively closing or opening the block chamber hole.

The first wax and the second wax may be different materials, and an operation temperature of the first opening/closing portion may be lower than an operation temperature of the second opening/closing portion.

The first opening/closing portion may include a first wax housing accommodating the first wax, a first piston disposed to the first wax housing and of which a position is changed according to volume change of the first wax, a first valve plate connected to the first piston and selectively closing or opening the head chamber hole and a first elastic member elastically supporting the first valve plate.

A first guide portion configured for guiding movement of the first valve plate may be formed at the first valve plate.

The second opening/closing portion may include a second wax housing accommodating the second wax, a second piston disposed to the second wax housing and of which a position is changed according to volume change of the second wax, a second valve plate connected to the second piston and selectively closing or opening the block chamber hole and a second elastic member elastically supporting the second valve plate.

A second guide portion configured for guiding movement of the second valve plate may be formed at the second valve plate.

A cooling system according to an exemplary embodiment of the present invention may include a variable water pump controlling discharging amount of coolant, an engine including a cylinder head and engine block receiving coolant from the variable water pump respectively, an internal housing including a partition defining a head chamber communicating with the cylinder head and a block chamber communicating with the engine block and the internal housing of which a head chamber hole and a block chamber hole are formed thereto, an external housing of which an outlet is formed thereto and the external housing covering the internal housing, a thermostat heater disposed to the partition, a first opening/closing portion including a first wax receiving heat from the thermostat heater and selectively closing or opening the head chamber hole, a second opening/closing portion including a second wax receiving heat from the thermostat heater and selectively closing or opening the block chamber hole, a radiator communicating with the outlet, a first coolant temperature sensor configured for detecting a temperature of coolant flowing through the cylinder head and outputting a corresponding signal, a second coolant temperature sensor configured for detecting a temperature of coolant flowing through the engine block and outputting a corresponding signal and a controller receiving vehicle operation state signals including output signals of the first, second coolant temperature sensors and the controller configured for controlling operations of the variable water pump and the thermostat heater.

The first wax and the second wax may be different materials, and an operation temperature of the first opening/closing portion may be lower than an operation temperature of the second opening/closing portion.

The first opening/closing portion may include a first wax housing accommodating the first wax, a first piston disposed to the first wax housing and of which a position is changed according to volume change of the first wax, a first valve plate connected to the first piston and selectively closing or opening the head chamber hole and a first elastic member elastically supporting the first valve plate.

The second opening/closing portion may include a second wax housing accommodating the second wax, a second piston disposed to the second wax housing and of which a position is changed according to volume change of the second wax, a second valve plate connected to the second piston and selectively closing or opening the block chamber hole and a second elastic member elastically supporting the second valve plate.

The cooling system may further include at least one heat exchange element communicating with the cylinder head and receiving coolant from the cylinder head.

A control method for a cooling system including a variable water pump controlling discharging amount of coolant, an engine including a cylinder head and engine block receiving coolant from the variable water pump respectively, an internal housing including a partition defining a head chamber communicating with the cylinder head and a block chamber communicating with the engine block and the internal housing of which a head chamber hole and a block chamber hole are formed thereto, an external housing of which an outlet is formed thereto and the external housing covering the internal housing, a thermostat heater disposed to the partition, a first opening/closing portion including a first wax receiving heat from the thermostat heater and selectively closing or opening the head chamber hole, a second opening/closing portion including a second wax receiving heat from the thermostat heater and selectively closing or opening the block chamber hole, a radiator communicating with the outlet, at least one heat exchange element communicating with the cylinder head and receiving coolant from the cylinder head, a vehicle operation state detecting portion including a first coolant temperature sensor configured for detecting a temperature of coolant flowing through the cylinder head and outputting a corresponding signal, a second coolant temperature sensor configured for detecting a temperature of coolant flowing through the engine block and outputting a corresponding signal, an accelerator pedal sensor and a vehicle speed sensor, a controller receiving vehicle operation state signals from the vehicle operation state detecting portion and controlling operations of the variable water pump and the thermostat heater, the control method according to an exemplary embodiment of the present invention may include determining, by the controller, whether the vehicle operation state signals satisfy a predetermined cold driving condition and controlling, by the controller, an operation of the variable water pump not to discharge coolant.

The control method may further include determining, by the controller, whether the vehicle operation state signals satisfy a predetermined high temperature driving condition and controlling, by the controller, operations of the variable water pump to discharge coolant and of the first opening/closing portion to be opened.

The control method may further include determining, by the controller, when the vehicle operation state signals satisfy a predetermined extreme high temperature driving condition and controlling, by the controller, operations of the variable water pump to discharge coolant and of the second opening/closing portion to be opened.

The vehicle operation state detecting portion may further include a heat exchanger signal portion detecting an operation state of at least one heat exchange element or detecting an operation requirement signal of at least one heat exchange element, and the control method may further include determining, by the controller, when the vehicle operation state signals satisfy a predetermined warm temperature driving condition and controlling, by the controller, operation of the variable water pump to discharge coolant.

An electronic thermostat, a cooling system provided with the same according to an exemplary embodiment of the present invention may enhance fuel economy by controlling supplying coolant to a cylinder head and an engine block independently.

According to an exemplary embodiment of the present invention of the present invention, coolant flows to a cylinder head and an engine block may be controlled independent with one thermostat heater so that total numbers of thereof may be reduced and layout of the system may be simplified.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
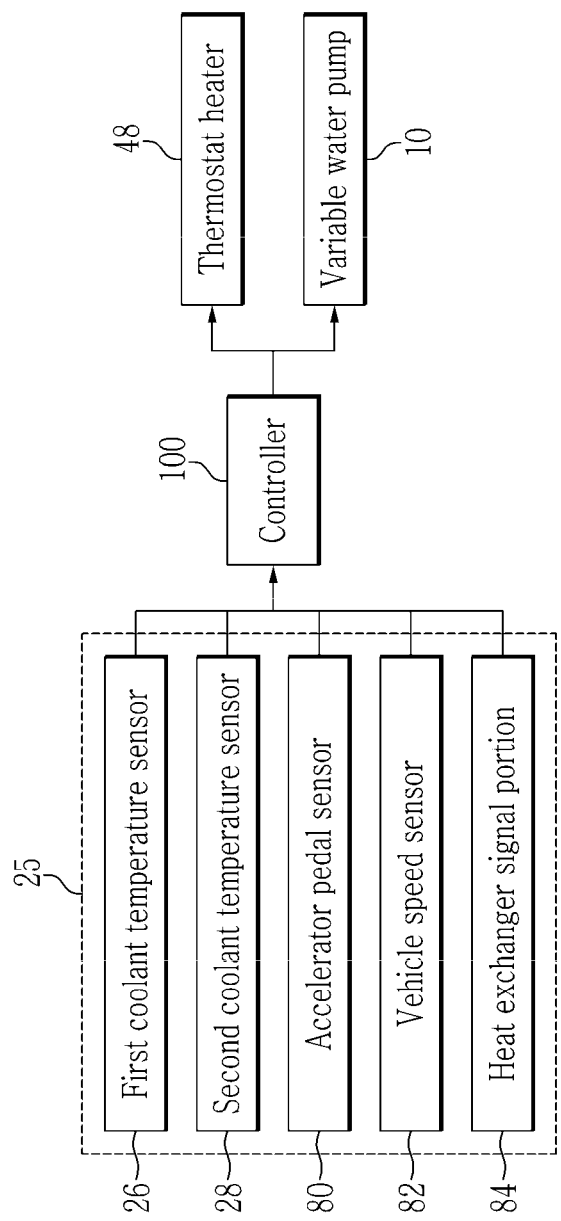
FIG. 1 is a block diagram of a cooling system according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE EMBODIMENTS

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following detailed description, only certain exemplary embodiments of the present invention have been shown and described, simply by way of illustration.

As those skilled in the art would realize, the described embodiments may be modified in various different ways, all without departing from the spirit or scope of the present invention However, parts which are not related with the description are omitted for clearly describing the exemplary embodiment of the present invention, and like reference numerals refer to like or similar elements throughout the specification.

In the specification, unless explicitly described to the contrary, the word "comprise" and variations such as "comprises" or "comprising", will be understood to imply the inclusion of stated elements but not the exclusion of any other elements.

An exemplary embodiment of the present invention will hereinafter be described in detail with reference to the accompanying drawings.

Figure 2:
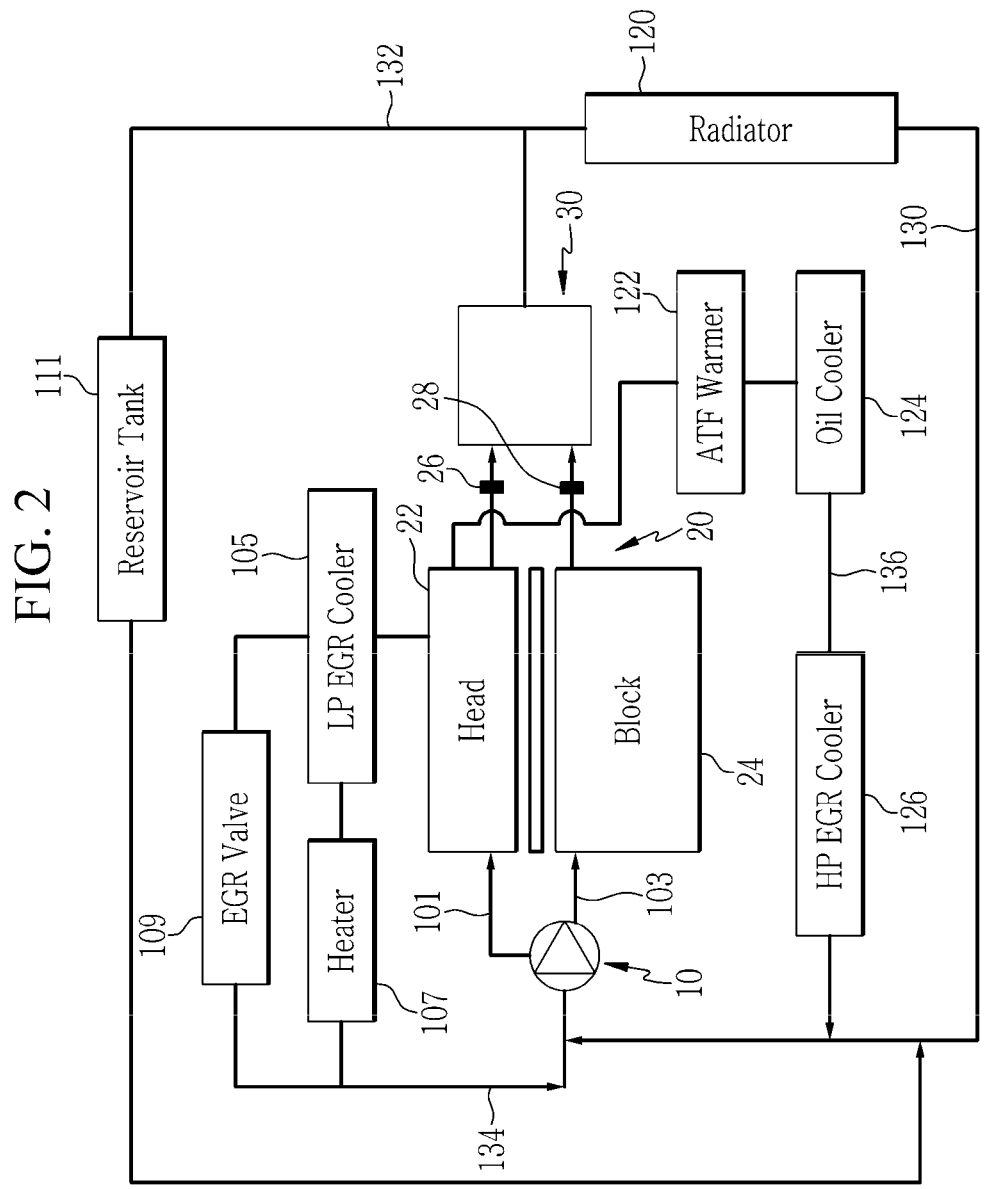
FIG. 2 is a schematic diagram of a cooling system according to an exemplary embodiment of the present invention.
Figure 3:
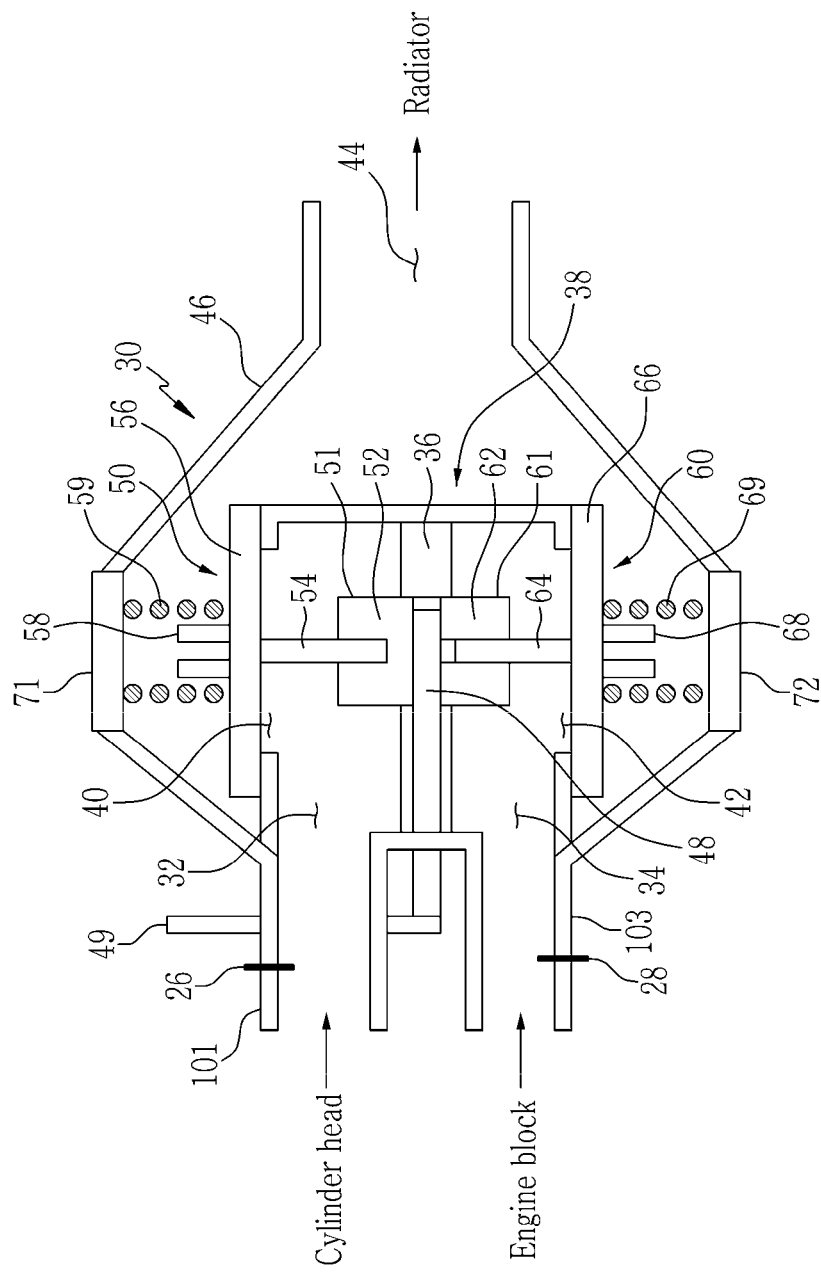
FIG. 3, FIG. 4 and to FIG. 5 are cross-sectional views of an electronic thermostat according to an exemplary embodiment of the present invention.
Figure 4:
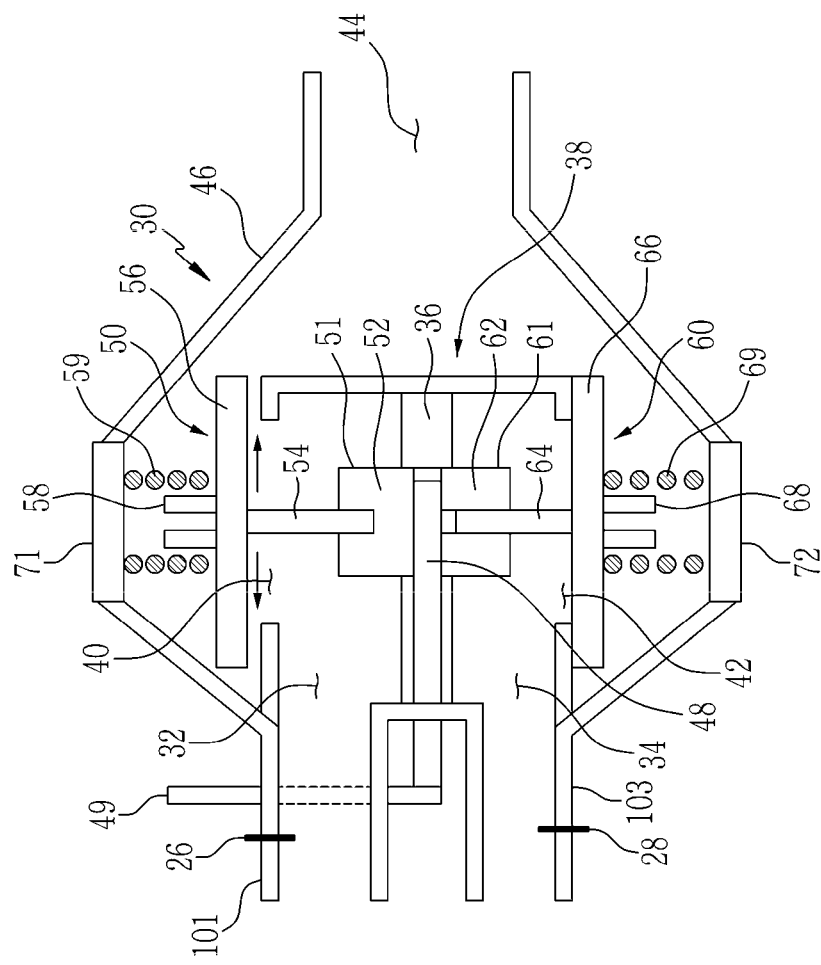
Figure 5:
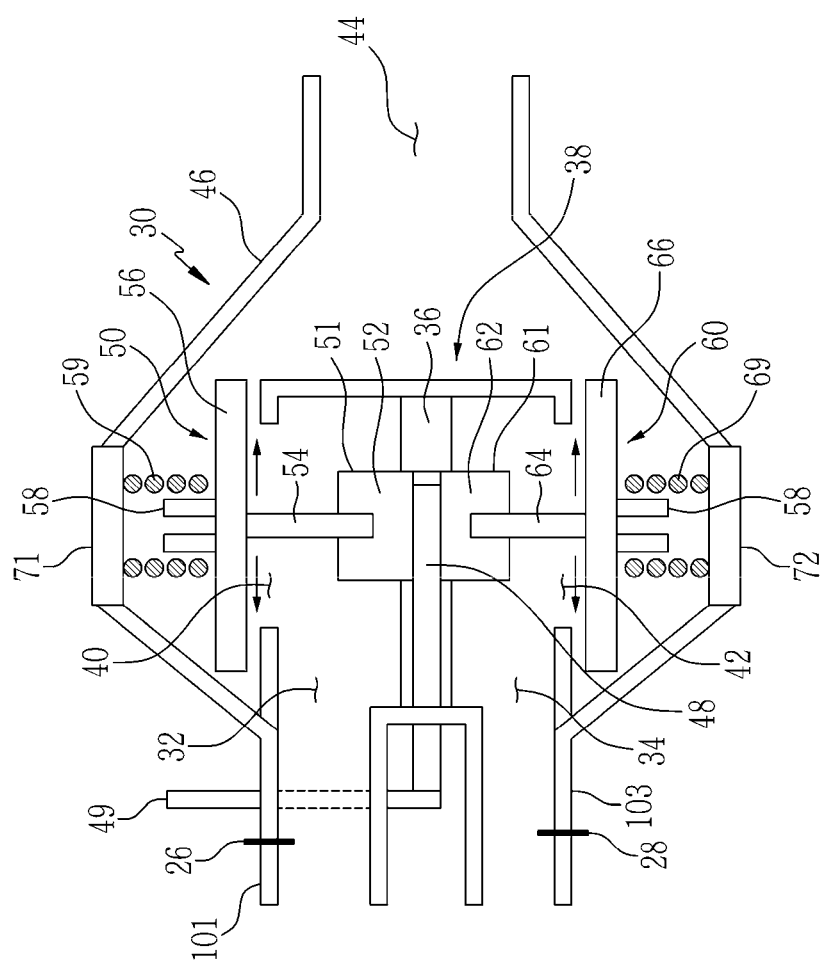

FIG. 1 is a block diagram of a cooling system according to an exemplary embodiment of the present invention, FIG. 2 is a schematic diagram of a cooling system according to an exemplary embodiment of the present invention and FIG. 3, FIG. 4 and to FIG. 5 are cross-sectional views of an electronic thermostat according to an exemplary embodiment of the present invention.

Referring to FIG. 1, a cooling system according to an exemplary embodiment of the present invention includes a variable water pump 10 controlling discharging amount of coolant, an engine 20 including a cylinder head 22 and engine block 24 receiving coolant from the variable water pump 10 respectively, an electronic thermostat 30, a vehicle operation state detecting portion 25 and a controller 100 controlling operations of the variable water pump 10 and the electronic thermostat 30 according to output signals of the vehicle operation state detecting portion 25.

The controller 100 may be implemented as one or more microprocessors operating by a predetermined program, and the predetermined program may include a series of commands for performing the exemplary embodiment of the present invention.

The variable water pump 10 may be various mechanical or electrical devices which may control coolant flows and flowing amount. and schemes and operations of the variable water pump 10, for example mechanical or electrical pumps are obvious to a person skilled in the art, so that detailed description will be omitted.

The electronic thermostat 30 according to an exemplary embodiment of the present invention includes an internal housing 38 including a partition 36 defining a head chamber 32 communicating with the cylinder head 22 through a head coolant line 101 and a block chamber 34 communicating with the engine block 24 through a block coolant line 103 and the internal housing 38 of which a head chamber hole 40 and a block chamber hole 42 are formed thereto, an external housing 46 of which an outlet 44 is formed thereto and the external housing 46 covering the internal housing 38, a thermostat heater 48 disposed to the partition 36, a first opening/closing portion 50 including a first wax 52 receiving heat from the thermostat heater 48 and selectively closing or opening the head chamber hole 40 and a second opening/closing portion 60 including a second wax 62 receiving heat from the thermostat heater 48 and selectively closing or opening the block chamber hole 42.

The first opening/closing portion 50 includes a first wax housing 51 accommodating the first wax 52, a first piston 54 slidably disposed to the first wax housing 51 and of which a position is changed according to volume change of the first wax 52, a first valve plate 56 connected to the first piston 54 and selectively closing or opening the head chamber hole 40 and a first elastic member 59 elastically supporting the first valve plate 56.

A first guide portion 58 configured for guiding movement of the first valve plate 56 is formed at the first valve plate 56. For example, the first guide portion 58 may guide the movement of the first valve plate 56 within the first elastic member 59.

The second opening/closing portion 60 includes a second wax housing 61 accommodating the second wax 62, a second piston 64 slidably disposed to the second wax housing 61 and of which a position is changed according to volume change of the second wax 62, a second valve plate 66 connected to the second piston 64 and selectively closing or opening the block chamber hole 42 and a second elastic member 69 elastically supporting the second valve plate 66.

A second guide portion 68 configured for guiding movement of the second valve plate 66 is formed at the second valve plate 66.

For example, the second guide portion 68 may guide the movement of the second valve plate 66 within the second elastic member 69.

Upper plates 71 and 72 are mounted to the external housing 46. The upper plates 71 and 72 are connected to the external housing 46 after assembling internal side of the electronic thermostat 30 for easy manufacturing.

The first and second elastic members 59 and 69 are disposed between the upper plates 71 and 72 and the first and second valve plates 56 and 66 respectively. The first and second elastic members 59 and 69 are elastic members such as a coil spring but are not limited thereto.

The thermostat heater 48 is electrically connected to an electric cable 49 and the controller 100 provides electricity through the electric cable 49 to the thermostat heater 48 for expanding the first wax 52 or the first wax 52 and the second wax 62.

The first wax 52 and the second wax 62 are different materials, and an operation temperature of the first opening/closing portion 50 is lower than an operation temperature of the second opening/closing portion 60.

Thus, after heating of the thermostat heater 48, the first opening/closing portion 50 is opened in advance.

The cooling system according to an exemplary embodiment of the present invention includes a radiator 120 communicating with the outlet 44 through a radiator line 130 and a reservoir tank 111 connected to the radiator line 130 through a reservoir tank line 132.

The cooling system according to an exemplary embodiment of the present invention further includes at least one heat exchange element communicating with the cylinder head 22 and receiving coolant from the cylinder head 22.

For example, the heat exchange element may include a heater 107, an LP EGR cooler 105, an EGR valve 109, an HP EGR cooler 126, an oil cooler 124 and an automatic transmission oil warmer 122.

For example, the heater 107, the LP EGR cooler 105 and the EGR valve 109 are communicating with the cylinder head 22 through a first heat exchange line 134 and the HP EGR cooler 126, the oil cooler 124 and the automatic transmission oil warmer 122 are communicating with the cylinder head 22 through a second heat exchange line 136.

The vehicle operation state detecting portion 25 includes a first coolant temperature sensor 26 detecting a temperature of coolant flowing through the cylinder head 22 and outputting a corresponding signal and a second coolant temperature sensor 28 detecting a temperature of coolant flowing through the engine block 24 and outputting a corresponding signal. and the controller 100 receives vehicle operation state signals including output signals of the first, second coolant temperature sensors 26 and 28 and controls operations of the variable water pump 10 and the thermostat heater 48.

In the drawing, the first coolant temperature sensor 26 and the second coolant temperature sensor 28 are mounted to the head coolant line 101 and the block coolant line 103 respectively. However, it is not limited thereto. The first coolant temperature sensor 26 may be mounted to the electronic thermostat 30 and the second coolant temperature sensor 28 may be mounted to the engine block 24.

The vehicle operation state detecting portion 25 may include an accelerator pedal sensor 80 outputting a signal corresponding to operations of an accelerator pedal and a vehicle speed sensor 82 outputting a signal corresponding to a vehicle speed.

FIG. 6, FIG. 7, FIG. 8 and FIG. 9 are drawings showing operations of a cooling system according to an exemplary embodiment of the present invention.

Hereinafter, referring to FIG. 1 to FIG. 9, a control method for the cooling system according to an exemplary embodiment of the present invention will be described.

Figure 6:
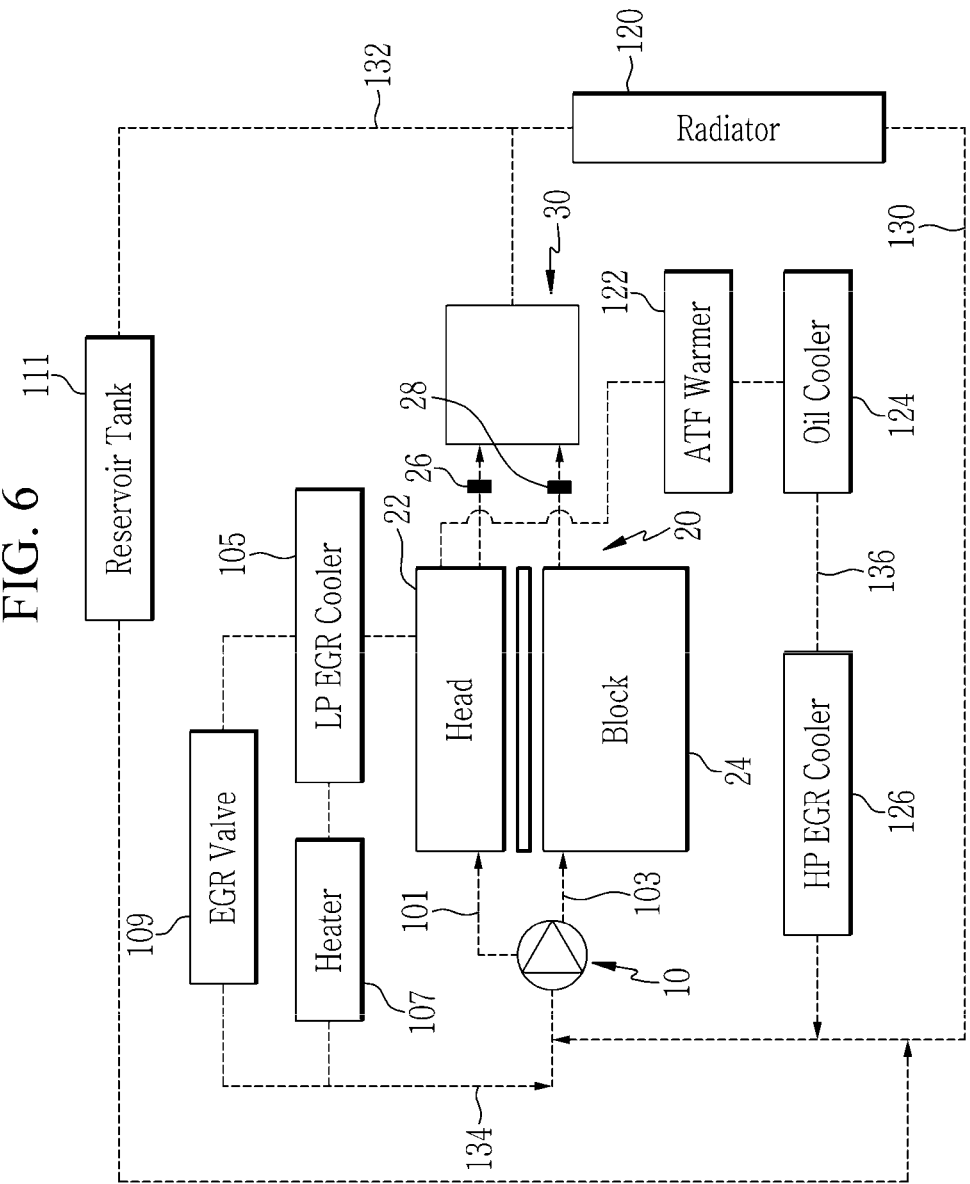
FIG. 6, FIG. 7, FIG. 8 and FIG. 9 are drawings showing operations of a cooling system according to an exemplary embodiment of the present invention.

The controller 100 determines whether the vehicle operation state signals satisfy a predetermined cold driving condition, and if the cold driving condition is satisfied, the controller 100 controls an operation of the variable water pump 10 not to discharge coolant as shown in FIG. 6.

The predetermined cold driving condition may be preset as the output signal of the first coolant temperature sensor 26 is less than 50° C. In the instant case, the variable water pump 10 does not supply coolant so that entire flowing of the coolant stops and warm-up timing of the engine 20 may be decreased.

Figure 8:
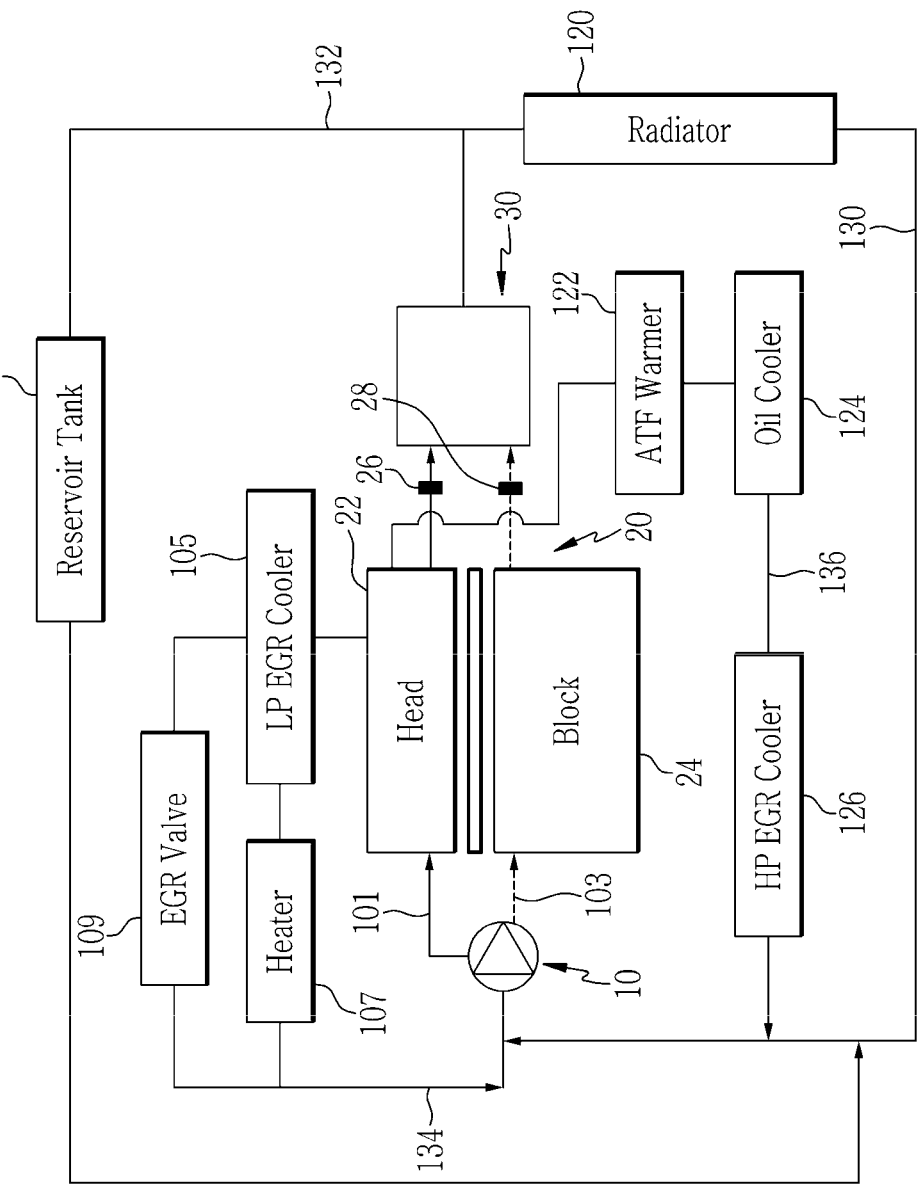

The controller 100 determines whether the vehicle operation state signals satisfy a predetermined high temperature driving condition and if the high temperature driving condition is satisfied, the controller 100 controls operations of the variable water pump 10 to discharge coolant and the thermostat heater 48 for the first opening/closing portion 50 to be opened as shown in FIG. 4 and FIG. 8.

In the high temperature driving condition, coolant in the engine block 24 is stagnated and coolant in the cylinder head 22 flows. Thus, the engine block 24 and the cylinder head 22 are separately cooled or cooled independently so that fuel economy may be enhanced.

Figure 9:
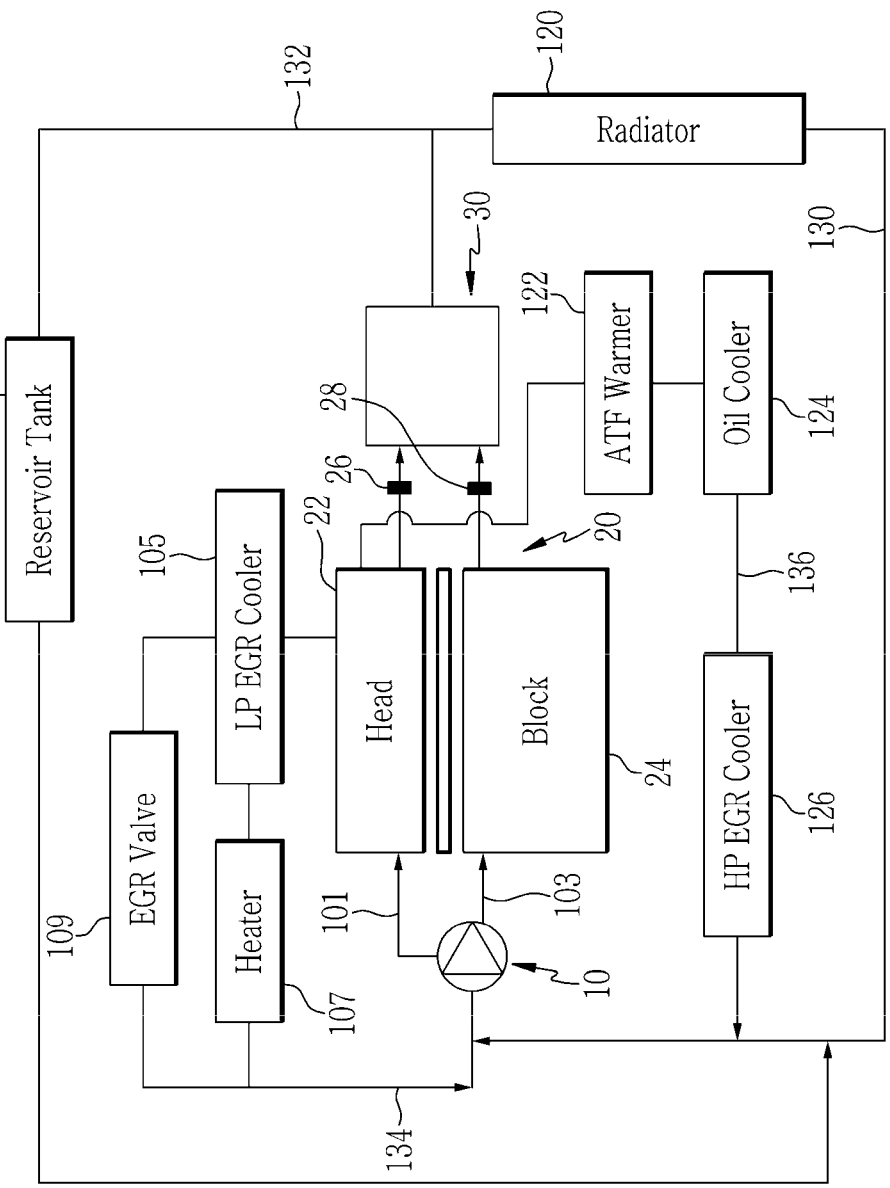

The controller 100 determines whether the vehicle operation state signals satisfy a predetermined extreme high temperature driving condition and if the extreme high temperature driving condition is satisfied, the controller 100 controls operations of the variable water pump 10 to discharge coolant and the thermostat heater 48 for the second opening/closing portion 60 to be opened as shown in FIG. 5 and FIG. 9.

In the extreme high temperature driving condition, coolant flows through the engine block 24 and the cylinder head 22 so that the engine block 24 and the cylinder head 22 are simultaneously cooled.

The high temperature driving condition and the extreme high temperature driving condition may be determined according to operation states of the engine.

For example, in a general driving condition, the first opening/closing portion 50 is opened at about 90° C. of the first coolant temperature sensor 26 and the second opening/closing portion 60 is opened at about 105° C. of the second coolant temperature sensor 28.

In a low speed/ low load driving condition, the first opening/closing portion 50 is opened at about 100° C. of the first coolant temperature sensor 26 and the second opening/closing portion 60 is opened at about 115° C. of the second coolant temperature sensor 28.

That is, proper/independent temperature managements of the cylinder head 22 and the engine block 24 are possible.

The vehicle operation state detecting portion 25 may further include a heat exchanger signal portion 84 detecting an operation state of at least one heat exchange element or detecting an operation requirement signal of at least one heat exchange element.

Figure 7:
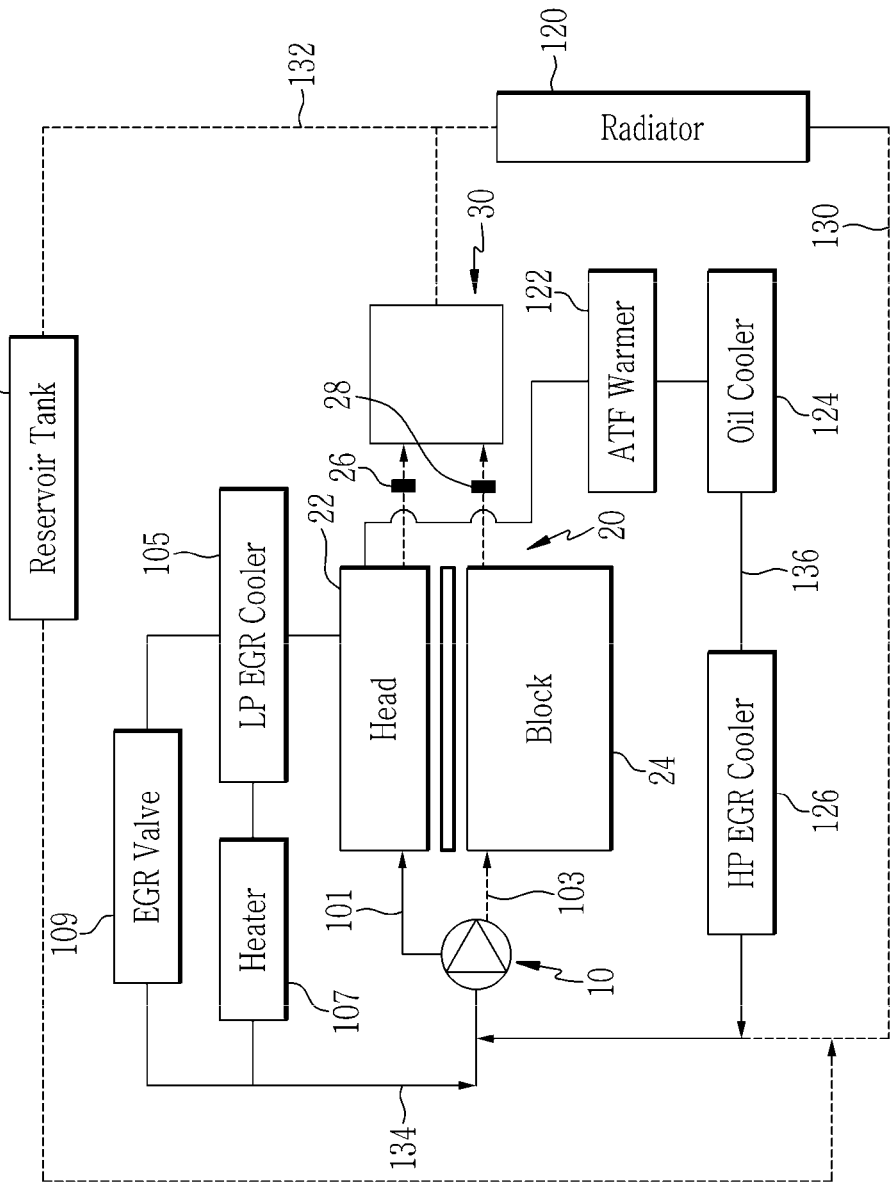

The controller 100 determines whether the vehicle operation state signals satisfy a predetermined warm temperature driving condition and if the warm temperature driving condition is satisfied, the controller 100 controls operations of the variable water pump 10 to discharge coolant as shown in FIG. 7.

The predetermined warm driving condition may be preset as the output signal of the first coolant temperature sensor 26 is between 50° C. and 90° C. or the predetermined warm driving condition may be satisfied when an operation signal of the heat exchanger signal portion 84 is detected. For example, the heat exchanger signal portion 84 may be a signal of which a driver operates the heater 107, heat exchange requirement signal of the oil cooler 124 and the like.

In the predetermined warm temperature driving condition, coolant temperature may rise, engine warm-up may be maintained, friction may be reduced so that fuel economy may be improved, and also the heat exchange element may receive heat.

As describe above, the electronic thermostat, the cooling system provided with the same according to the exemplary embodiment of the present invention may enhance fuel economy by controlling supplying coolant to a cylinder head and an engine block independently.

Also, according to the exemplary embodiment of the present invention, coolant flows to the cylinder head and the engine block may be controlled independent with one thermostat heater so that total numbers of thereof may be reduced and layout of the system may be simplified.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An electronic thermostat apparatus comprising:
   an internal housing including:
      a partition of defining a head chamber fluidically-communicating with a cylinder head and a block chamber fluidically-communicating with an engine block wherein the partition is stationary; and
      a head chamber hole positioned at a side of the head chamber and a block chamber hole positioned at a side of the block chamber;
   an external housing including an outlet, wherein the external housing is configured to cover the internal housing;
   a thermostat heater mounted to the partition;
   a first opening/closing portion fixed to the partition and including a first wax mounted on a first side of the thermostat heater and receiving heat from the thermostat heater and selectively closing or opening the head chamber hole formed on the internal housing to selectively connect the head chamber to the outlet of the external housing; and
   a second opening/closing portion fixed to the partition and including a second wax mounted on a second side of the thermostat heater and receiving heat from the thermostat heater and selectively closing or opening the block chamber hole formed on the internal housing to selectively connect the block chamber to the outlet of the external housing.

2. The electronic thermostat apparatus of claim 1,
   wherein the first wax and the second wax are different materials, and
   wherein an operation temperature of the first opening/closing portion is lower than an operation temperature of the second opening/closing portion.

3. The electronic thermostat apparatus of claim 2, wherein the first opening/closing portion further includes:
   a first wax housing accommodating the first wax;
   a first piston slidably mounted to the first wax housing, wherein a position of the first piston is changed according to a volume change of the first wax;
   a first valve plate connected to the first piston and selectively closing or opening the head chamber hole; and
   a first elastic member elastically supporting the first valve plate.

4. The electronic thermostat apparatus of claim 3, wherein a first guide portion configured for guiding a movement of the first valve plate is formed at the first valve plate.

5. The electronic thermostat apparatus of claim 3, wherein the first elastic member is disposed between the internal housing and the external housing.

6. The electronic thermostat apparatus of claim 2, wherein the second opening/closing portion further including:
   a second wax housing of accommodating the second wax;
   a second piston slidably mounted to the second wax housing, wherein a position of the second piston is changed according to a volume change of the second wax;
   a second valve plate connected to the second piston and selectively closing or opening the block chamber hole; and
   a second elastic member elastically supporting the second valve plate.

7. The electronic thermostat apparatus of claim 6, wherein a guide portion configured for guiding a movement of the second valve plate is formed at the second valve plate.

8. The electronic thermostat apparatus of claim 6, wherein the second elastic member is disposed between the internal housing and the external housing.

9. A cooling system comprising:
   a variable water pump controlling discharging amount of coolant;
   an engine including a cylinder head and an engine block receiving the coolant from the variable water pump respectively;
   an internal housing including:
      a partition defining a head chamber fluidically-communicating with the cylinder head and a block chamber fluidically-communicating with the engine block wherein the partition is stationary;
      a head chamber hole positioned at a side of the head chamber and a block chamber hole positioned at a side of the block chamber;
   an external housing including an outlet, wherein the external housing is configured to cover the internal housing;
   a thermostat heater mounted to the partition;
   a first opening/closing portion fixed to the partition and including a first wax mounted on a first side of the thermostat heater receiving heat from the thermostat heater and selectively closing or opening the head chamber hole formed on the internal housing to selectively connect the head chamber to the outlet of the external housing;
   a second opening/closing portion fixed to the partition and including a second wax mounted on a second side of the thermostat heater and receiving heat from the thermostat heater and selectively closing or opening the block chamber hole formed on the internal housing to selectively connect the block chamber to the outlet of the external housing;
   a radiator fluidically-communicating with the outlet of the external housing;
   a first coolant temperature sensor configured for detecting a temperature of coolant flowing through the cylinder head and outputting a first signal;
   a second coolant temperature sensor configured for detecting a temperature of coolant flowing through the engine block and outputting a second signal; and
   a controller connected to the variable water pump and the thermostat heater, and configured for receiving vehicle operation state signals including the first and second signals of the first and second coolant temperature sensors, wherein the controller is configured for controlling operations of the variable water pump and the thermostat heater, based on the vehicle operation state signals.

10. The cooling system of claim 9,
    wherein the first wax and the second wax are different materials, and wherein an operation temperature of the first opening/closing portion is lower than an operation temperature of the second opening/closing portion.

11. The cooling system of claim 9, wherein the first opening/closing portion further includes:
a first wax housing accommodating the first wax;
a first piston slidably mounted to the first wax housing, wherein a position of the first piston is changed according to a volume change of the first wax;
a first valve plate connected to the first piston and selectively closing or opening the head chamber hole; and
a first elastic member elastically supporting the first valve plate.

12. The cooling system of claim 11, wherein the first elastic member is disposed between the internal housing and the external housing.

13. The cooling system of claim 9, wherein the second opening/closing portion including:
a second wax housing of accommodating the second wax;
a second piston slidably mounted to the second wax housing, wherein a position of the second piston is changed according to a volume change of the second wax;
a second valve plate connected to the second piston and selectively closing or opening the block chamber hole; and
a second elastic member elastically supporting the second valve plate.

14. The cooling system of claim 13, wherein the second elastic member is disposed between the internal housing and the external housing.

15. The cooling system of claim 9, further includes at least one heat exchange element fluidically-communicating with the cylinder head and receiving coolant from the cylinder head.

16. A control method for a cooling system including a variable water pump controlling discharging amount of coolant, an engine including a cylinder head and an engine block receiving the coolant from the variable water pump respectively, an internal housing including a partition defining a head chamber fluidically-communicating with the cylinder head and a block chamber fluidically-communicating with the engine block wherein the partition is stationary, a head chamber hole positioned at a side of the head chamber and a block chamber hole positioned at a side of the block chamber, an external housing including an outlet, wherein the external housing is configured to cover the internal housing, a thermostat heater mounted to the partition, a first opening/closing portion fixed to the partition and including a first wax mounted on a first side of the thermostat heater and receiving heat from the thermostat heater and selectively closing or opening the head chamber hole formed on the internal housing to selectively connect the head chamber to the outlet of the external housing, and a second opening/closing portion fixed to the partition and including a second wax mounted on a second side of the thermostat heater and receiving heat from the thermostat heater and selectively closing or opening the block chamber hole formed on the internal housing to selectively connect the block chamber to the outlet of the external housing, a radiator fluidically-communicating with the outlet of the external housing, at least one heat exchange element communicating with the cylinder head and receiving coolant from the cylinder head, a vehicle operation state detecting portion including a first coolant temperature sensor configured for detecting a temperature of coolant flowing through the cylinder head and outputting a first signal, a second coolant temperature sensor configured for detecting a temperature of coolant flowing through the engine block and outputting a second signal, an accelerator pedal sensor and a vehicle speed sensor, and a controller configured for receiving vehicle operation state signals from the vehicle operation state detecting portion and configured for controlling operations of the variable water pump and the thermostat heater, based on the vehicle operation state signals, the control method including:
determining, by the controller, when the vehicle operation state signals satisfy a predetermined cold driving condition and controlling, by the controller, operation of the variable water pump not to discharge coolant.

17. The control method of claim 16, further includes:
determining, by the controller, when the vehicle operation state signals satisfy a predetermined high temperature driving condition; and
controlling, by the controller, operation of the variable water pump to discharge coolant and operation of the first opening/closing portion to be open.

18. The control method of claim 16, further includes:
determining, by the controller, when the vehicle operation state signals satisfy a predetermined extreme high temperature driving condition; and
controlling, by the controller, operation of the variable water pump to discharge coolant and operation of the second opening/closing portion to be open.

19. The control method of claim 16,
wherein the vehicle operation state detecting portion further includes a heat exchanger signal portion detecting an operation state of the at least one heat exchange element or detecting an operation requirement signal of the at least one heat exchange element, and
wherein the control method further includes:
determining, by the controller, when the vehicle operation state signals satisfy a predetermined warm temperature driving condition; and
controlling, by the controller, operation of the variable water pump to discharge coolant.

* * * * *